UNITED STATES PATENT OFFICE.

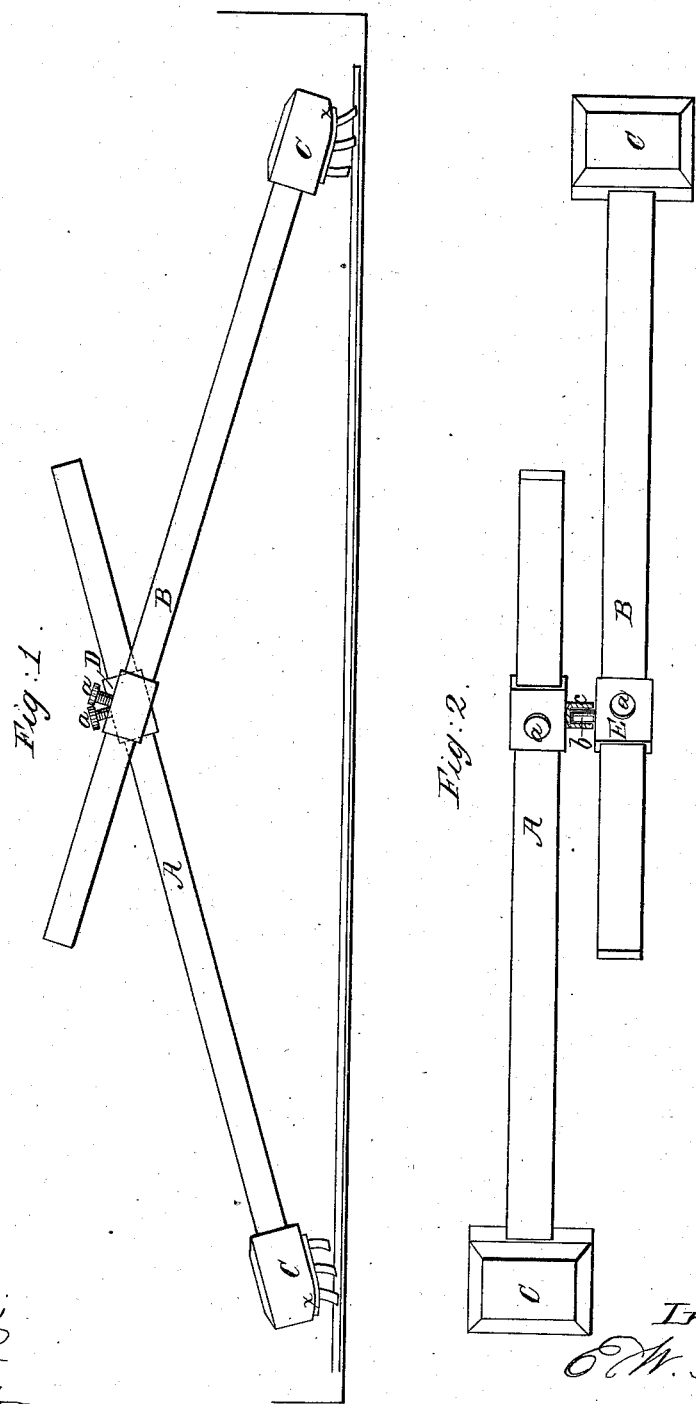

E. W. TWING, OF SPRINGFIELD, MASSACHUSETTS.

IMPROVED CARPET-STRETCHER.

Specification forming part of Letters Patent No. 55,935, dated June 26, 1866.

*To all whom it may concern:*

Be it known that I, E. W. TWING, of Springfield, in the county of Hampden and State of Massachusetts, have invented a new and Improved Carpet-Stretcher; and I do hereby declare that the following is a full, clear, and exact description thereof, which will enable others skilled in the art to make and use the same, reference being had to the accompanying drawings, forming part of this specification, in which—

Figure 1 is a side elevation of my invention. Fig. 2 is a plan or top view.

Similar letters of reference indicate like parts.

My invention consists in a novel manner of coupling together the two levers or shafts of a carpet-stretcher; also, in the employment of a head having a partially convex face to which the studs are attached, by which the use of a joint near the head of the stretcher is dispensed with.

A B designate the two shafts or levers, and C the heads attached, respectively, to each lever.

D E are metallic slides which encircle the shafts A B, and are fitted to slide up and down thereon, each being provided with a set-screw, $a$, for holding it at any desired point along the length of the shaft.

The slide E has projecting from one of its sides a pivot, $b$, which is fitted to work in a socket, $c$, on the side of the slide D. The coupling together of the two shafts is effected by merely placing this pivot $b$ in its socket $c$, and vice versa for the uncoupling.

Each head C has a slightly rounding or convex face, as shown clearly at $x$, Fig. 1. The chamfering commences at about the center, and increases toward the outer end of each head. The leather carrying the studs or teeth is secured to this rounding face and consequently assumes, as a whole, a corresponding rounding outer surface.

By making the face rounding, as specified, the teeth will catch effectively whatever be the angle of the shaft relatively with the floor, and this dispenses with the necessity of a joint at or near the head, for it is obvious that if the teeth were on a plane surface, and the angle of the shaft with the floor be a few degrees, only the front row of teeth would catch in the carpet. Hence, in such a case a joint is necessary, which materially weakens the stretcher, besides adding to its expense; but by making the face rounding the greater portion of the teeth will catch in the carpet, however great may be the angle of the shaft relatively with the floor. The teeth are shown as being attached to a leather which is applied to the face of the heads; but it is obvious that they could be applied to the head directly, if desired.

The stretcher is used by placing the heads of both shafts in the desired place upon the carpet, and so that when they are coupled together the angle each shaft describes with the floor may be, say, about forty-five degrees, as shown in the drawings; then by pressing down upon the shafts at the point where they are coupled the two heads are thrown from each other, which of course effects the stretching of the carpet. This will be understood by reference to Fig. 1 of the drawings.

What I claim as new, and desire to secure by Letters Patent, is—

1. The coupling consisting of the slides D E, pivot $b$, socket $c$, and set-screw $a$, or its equivalent, in combination with the shafts A B of a carpet-stretcher, substantially as specified.

2. The rounded head C, in combination with the levers A B and slides D E, arranged and operating in the manner and for the purpose herein specified.

E. W. TWING.

Witnesses:
J. F. ROCKETT,
P. W. DICKINSON.